United States Patent
Choi et al.

(10) Patent No.: US 9,773,164 B2
(45) Date of Patent: Sep. 26, 2017

(54) APPARATUS AND METHOD FOR RECOGNIZING HUMAN BODY IN HYBRID MANNER

(71) Applicant: Samsung Electronics Co., Ltd., Gyeonggi-do (KR)

(72) Inventors: Jin-Wuk Choi, Seoul (KR); Ho-Yub Jung, Seoul (KR); Jung-Seop Kim, Seoul (KR); Nam-Su Ha, Gyeonggi-do (KR); Dong-Wook Kwon, Gyeonggi-do (KR); Kyung-Il Kim, Gyeonggi-do (KR); Min-Ho Kim, Gyeonggi-do (KR); Gi-Sang Lee, Gyeonggi-do (KR); Sang-Bo Lee, Gyeonggi-do (KR); Jin-Kyung Lee, Gyeonggi-do (KR); Young-Gu Jin, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 545 days.

(21) Appl. No.: 14/282,650

(22) Filed: May 20, 2014

(65) Prior Publication Data
US 2014/0341428 A1    Nov. 20, 2014

(30) Foreign Application Priority Data
May 20, 2013    (KR) ........................ 10-2013-0056656

(51) Int. Cl.
*G06K 9/00*    (2006.01)
(52) U.S. Cl.
CPC ............................. *G06K 9/00369* (2013.01)

(58) Field of Classification Search
None
See application file for complete search history.

(56) References Cited

U.S. PATENT DOCUMENTS

| | | | | |
|---|---|---|---|---|
| 7,756,293 B2* | 7/2010 | Kuwabara | .......... | G06K 9/00355 382/103 |
| 8,289,128 B2* | 10/2012 | Hsieh | .......... | G08B 13/22 340/3.1 |
| 9,410,980 B2* | 8/2016 | Sahadeo | .......... | G01P 13/00 |
| 2006/0098846 A1* | 5/2006 | Kuwabara | .......... | G06K 9/00355 382/107 |
| 2010/0310157 A1 | 12/2010 | Kim et al. | | |
| 2013/0069867 A1* | 3/2013 | Watanabe | .......... | G06F 3/017 345/156 |
| 2013/0156314 A1* | 6/2013 | Pham | .......... | G06T 7/0091 382/173 |

(Continued)

FOREIGN PATENT DOCUMENTS

| | | |
|---|---|---|
| KR | 1020060097400 | 9/2006 |
| KR | 1020100104272 | 9/2010 |

*Primary Examiner* — Nancy Bitar
(74) *Attorney, Agent, or Firm* — The Farrell Law Firm, P.C.

(57) ABSTRACT

An apparatus and a method for recognizing a human body in a hybrid manner are provided. The method includes calculating body information used for recognizing a human body from an input image, detecting a region of the human body in a learning-based human body recognition manner by using the calculated body information, and tracing a movement of the detected region of the human body in a modeling-based human body recognition manner. Thereby, it is possible to quickly perform more accurate and precise recognition of the human body.

11 Claims, 5 Drawing Sheets

(56) References Cited

U.S. PATENT DOCUMENTS

2013/0266182 A1* 10/2013 Shotton .............. G06K 9/00369
                                                          382/103
2014/0254883 A1*  9/2014 Kim ...................... G06T 7/2033
                                                          382/107
2015/0235366 A1*  8/2015 Lee .......................... G06T 9/00
                                                          382/118

* cited by examiner

APPARATUS AND METHOD FOR RECOGNIZING HUMAN BODY IN HYBRID MANNER

PRIORITY

This application claims priority under 35 U.S.C. §119(a) to Korean Patent Application Serial No. 10-2013-0056656, which was filed in the Korean Intellectual Property Office on May 20, 2013, the entire content of which is incorporated herein by reference.

BACKGROUND

1. Field of the Invention

The present invention generally relates to an apparatus and a method for recognizing a human body, and more particularly, to an apparatus and a method for precisely recognizing a human body by hybridizing learning-based human body recognition and modeling-based human body recognition.

2. Description of the Related Art

Generally, learning-based human body recognition and modeling-based human body recognition have been used in order to recognize a human body. The learning-based human body recognition is a method of detecting a characteristic of each part of the human body from a plurality of images, and recognizing the human body from a result obtained by learning up to several million images after a database including the detected characteristic of each part of the human body is constructed. The learning-based human body recognition generally has high precision for the recognition of the human body. On the other hand, the modeling-based human body recognition is a method of recognizing the human body based on a characteristic of the human body, such as a length, a volume, and the like of each part of the human body, by analyzing the body of a human being. The modeling-based human body recognition has an advantage of having a high speed in the recognition of the human body.

Conventionally, the body of the human being has been recognized by using one of the learning-based human body recognition or the modeling-based human body recognition, as described above.

However, the learning-based human body recognition has a disadvantage in requiring a data storage unit for storing data obtained through learning, analysis of a large amount of data, and a significant amount of calculation for the analysis.

Further, in the modeling-based human body recognition, there is a problem in that precision for the recognition of the human body is lower than that of the learning-based human body recognition.

SUMMARY

The present invention has been made to address at least the above-mentioned problems and disadvantages in the conventional art, and to provide at least the advantages described below. Accordingly, an aspect of the present invention is to provide an apparatus and method for recognizing a human body in a hybrid manner using both learning-based human body recognition and modeling-based human body recognition.

In accordance with an aspect of the present invention, an apparatus for recognizing a human body in a hybrid manner is provided. The apparatus includes an image sensor which outputs an image; a learning-based recognition unit which detects a region of the human body in a learning-based human body recognition manner; a modeling-based recognition unit which traces a movement of the region of the human body in a modeling-based human body recognition manner; and a controller which calculates body information used for recognizing the human body from the image, controls to detect the region of the human body by using the calculated body information, and traces the movement of the detected region of the human body.

In accordance with another aspect of the present invention, a method of recognizing a human body in a hybrid manner is provided. The method includes calculating body information used for recognizing the human body from an image if the image is input; detecting a region of the human body in a learning-based human body recognition manner by using the calculated body information; and tracing a movement of the detected region of the human body in a modeling-based human body recognition manner.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Hereinafter, specific embodiments of the present invention will be described with reference to the accompanying drawings. However, the present invention is not restricted to the embodiments described herein, and is not limited to the embodiments. The same reference numerals represented in each of the drawings indicate elements that perform substantially the same functions.

Terms including ordinal numerals such as "first", "second", and the like can be used to describe various structural elements, but the structural elements are not limited by these terms. The terms are used only to distinguish one structural element from another structural element. For example, without departing from the scope of the present invention, a first structural element may refer to a second structural element. Similarly, the second structural element also may refer to the first structural element. The terms used in this application are for the purpose of describing particular embodiments only and are not intended to be limiting of the invention. As used herein, singular forms are intended to include plural forms as well, unless the context clearly indicates otherwise.

Figure 1:
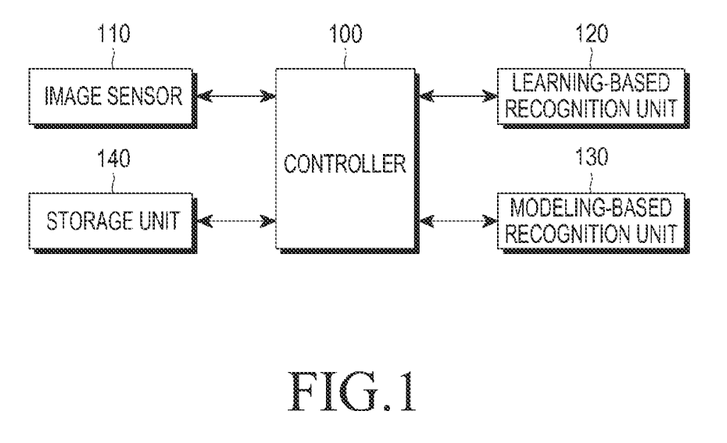
FIG. 1 is a block diagram illustrating an apparatus for recognizing a human body according to an embodiment of the present invention.

FIG. 1 is a block diagram illustrating an apparatus for recognizing a human body according to an embodiment of the present invention.

The apparatus for recognizing the human body according to the embodiment of the present invention includes a controller 100, an image sensor 110, a learning-based recognition unit 120, a modeling-based recognition unit 130, and a storage unit 140.

The controller 100 controls an operation of the apparatus for recognizing the human body, and particularly controls operations of the image sensor 110, the learning-based recognition unit 120, the modeling-based recognition unit 130, and the storage unit 140.

The controller 100 generates an image in which an image of the human body in an $n^{th}$ image input through the image sensor 110 is labeled into a plurality of regions. Here, the image includes a depth image and a color image, and the term "depth image" means an image representing depth information. Here, n is a natural number.

Particularly, the controller 100 creates a labeled image having a different color in each of a plurality of regions according to a labeling input, if there is the labeling input, for distinguishing an image of the human body in the image separated into the plurality of regions with different colors. For example, the labeled image has a pixel value which may be set by a user such that all pixels in the plurality of regions have different colors, and the pixel value may be set as a color value such as red, yellow, and the like.

The controller 100 sets an image characteristic in each labeled region. For example, the controller 100 may set a characteristic corresponding to a specific position in the labeled region.

The controller 100 calculates a probability of each region in the human body corresponding to the image characteristic. In other words, the controller 100 calculates the probability of each region in the human body in order to determine which region of the human body the set image characteristic corresponds to. For example, the controller 100 can calculate the probability such that the characteristics present in the image are compared with one another, and each characteristic corresponds to a region of the human body, such as a hand region, a head region, a chest region, and the like.

The controller 100 sets each labeled region as a region of the human body corresponding to the highest probability based on the calculated probability, and calculates a center point of each set region of the human body. At this time, the controller 100 may execute a mean shift algorithm for a predetermined number of times, and calculate the center point of each region of the human body. Here, the mean shift algorithm is used for calculating the center point, and is well-known in the art. Thus, the description of the mean shift algorithm will be omitted.

Then, the controller 100 generates and stores a frame, in which the center points in all regions of the human body are connected, in the storage unit 140.

The controller 100 measures lengths of the regions in pairs among the regions of the human body, and determines whether the measured lengths in the pairs of the regions of the human body are symmetric. Here, the length of the region of the human body means a length from a starting point to an ending point of the frame corresponding to a certain region of the human body.

If the measured lengths in the pairs of the regions of the human body are symmetric, the controller 100 measures and stores a length of each region of the human body in the storage unit 140. For example, the controller 100 measures a length of a left arm and leg region and a length of a right arm and leg region, and if the length of the left arm and leg region is symmetric to the length of the right arm and leg region, lengths of arm, leg and body regions are measured and stored.

Further, the controller 100 may apply a Gaussian filter to each of regions of the human body corresponding to a head and a neck so as to assign a weight to each region of the human body to clearly distinguish each region of the human body. For example, the controller 100 assigns a large weight to the region of the human body located at a position near the image sensor 110, and a small weight to the region of the human body located at a position far from the image sensor 110. In an embodiment of the present invention, as described above, a weight is assigned according to a distance from each region of the human body to the image sensor 110, thereby reducing a shaking of the region of the human body. Such an operation of assigning the weight is selectively applied, and may not be performed if unnecessary.

The controller 100 sets one or more regions of the human body as a reference region of the human body, and defines a coordinate set of each of one or more reference regions of the human body based on a coordinate of a center point in each of the set regions of the human body.

For example, the controller 100 sets a coordinate of a center point in a chest region as a relative reference coordinate, and calculates a coordinate of a center point in a left shoulder region, a coordinate of a center point in a right shoulder region and a coordinate of a center point in an abdomen region, based on the set reference coordinate, so as to define the coordinates as a coordinate set of the chest region. Further, the controller 100 sets the coordinate of the center point in the left shoulder region as the relative reference coordinate, and calculates the coordinate of the center point in the chest region, the coordinate of the center point in the right shoulder region and the coordinate of the center point in the abdomen region, based on the set reference coordinate, so as to define the coordinates as a coordinate set of the left shoulder region. The controller 100 also sets the coordinate of the center point in the right shoulder region as the relative reference coordinate, and calculates the coordinate of the center point in the chest region, the coordinate of the center point in the left shoulder region and the coordinate of the center point in the abdomen region, based on the set reference coordinate, so as to define the coordinates as a coordinate set of the right shoulder region. The controller 100 further sets the coordinate of the center point in the abdomen region as the relative reference coordinate, and calculates the coordinate of the center point in the chest region, the coordinate of the center point in the left shoulder region and the coordinate of the center point in the right shoulder region, based on the set reference coordinate, so as to define the coordinates as a coordinate set of the abdomen region.

Then, the controller 100 measures lengths of a left body region and a right body region, and determines whether the measured lengths of the left and right body regions are symmetric. If the lengths of the left and right body regions are symmetric, the controller 100 measures and stores a distance between the reference regions of the human body. For example, the controller 100 calculates and stores a length from the center point of the chest region to the center point of the left shoulder region, a length from the center point of the chest region to the center point of the right shoulder region, and a length from the center point of the chest region to the center point of the abdomen region, based on the coordinates of the center points of each region. Further, the controller 100 calculates and stores a length from the center point of the left shoulder region to the center point of the chest region, a length from the center point of the left shoulder region to the center point of the right shoulder region, and a length from the center point of the left shoulder region to the center point of the abdomen region, based on the coordinates of the center points of each region. The controller 100 calculates and stores a length from the center point of the right shoulder region to the center point of the chest region, a length from the center point of the right shoulder region to the center point of the left shoulder region, and a length from the center point of the right shoulder region to the center point of the abdomen region, based on the coordinates of the center points of each region. The controller 100 calculates and stores a length from the center point of the abdomen region to the center point of the chest region, a length from the center point of the abdomen region to the center point of the left shoulder region, and a length from the center point of the abdomen region to the center point of the right shoulder region, based on the coordinates of the center points of each region.

The controller 100 measures and stores a coordinate set of the center points of the at least one region of the human body included in the body region and a length of each region of the human body in the storage unit 140. For example, the controller 100 calculates and stores a coordinate of a center point of a neck region, a coordinate of a center point of a left shoulder and a coordinate of a center point of a right shoulder. Then, the controller 100 calculates and stores a length from the center point of the neck region to the center point of the left shoulder region and a length from the center point of the neck region to the center point of the right shoulder region, calculates and stores a length from the center point of the left shoulder region to the center point of the neck region and a length from the center point of the left shoulder region to the center point of the right shoulder region, and calculates and stores a length from the center point of the right shoulder region to the center point of the neck region and a length from the center point of the right shoulder region to the center point of the left shoulder region, based on the coordinates of the center points of each region.

Further, the controller 100 calculates and stores a coordinate of a center point of a left sacrum region and a coordinate of a center point of a right sacrum region, and calculates and stores a length from the center point of the left sacrum region to a center point of the right sacrum region and a length from the center point of the right sacrum region to the center point of the left sacrum region, based on the coordinates of the center points of each region.

Then, the controller 100 detects an edge for the labeled image, and the edge for each region of the human body is reset by using the detected edge, the length of each region of the human body and the stored frame. Particularly, the controller 100 detects the edge for the labeled image of the human body, and selects the shortest straight line from lines which extend from each pixel constituting the detected edge to the frame to be perpendicular to the frame. In turn, the controller 100 determines whether an intersection of the selected line with the frame is included in the measured length of the corresponding region of the human body. In other words, the controller 100 determines which position the intersection of the selected line with the frame is located at on the frame corresponding to a corresponding region of the human body, and whether the intersection is included in the frame corresponding to the measured length of the stored region of the human body. Here, the measured length of each region of the human body means a length of the frame corresponding to each region of the human body.

If the intersection of the selected line with the frame is positioned within the measured length of the corresponding region of the human body, the controller 100 maintains a setting for the edge corresponding to the corresponding region of the human body.

If the intersection of the selected line with the frame is positioned outside of the measured length of the corresponding region of the human body, the controller 100 identifies the region of the human body in which the intersection of the selected line with the frame is positioned, and resets the edge corresponding to the corresponding region of the human body by the edge corresponding to the identified region of the human body.

For example, the controller 100 determines whether a first position at which a straight line vertically extending from a first pixel constituting an edge of an elbow region to a frame corresponding to the elbow region meets the frame is present in the frame corresponding to the length of the elbow region which is previously stored. If the first position is present in the previously stored frame corresponding to the length of the elbow region, the controller 100 maintains the first pixel itself, while identifying a region of the human body in which the first position is present if the first position is not present in the previously stored frame corresponding to the length of the elbow region. If the identified region of the human body corresponds to an arm region, the controller 100 resets the first pixel by a pixel constituting an edge of an arm region. Thus, in the present invention, the regions of the human body can be more clearly distinguished.

The controller 100 applies a Gaussian filter to arm and leg regions in order to assign a weight to the arm and leg regions. The application of the filter is carried out in the same manner as that described above.

The controller 100 measures and stores a coordinate set of center points of hand and elbow regions and the length of each region of the human body in the storage unit 140.

For example, the controller 100 calculates and stores a length from a center point of the hand region to a center point of the elbow region, and a length from the center point of the elbow region to the center point of the hand region.

Then, the controller 100 performs an operation described above for an $(n+1)^{th}$ image when the $(n+1)^{th}$ image is input.

The learning-based human body recognition and the modeling-based human body recognition are complementarily performed by using information on the human body which is stored through the processes, thereby accurately and precisely recognizing the human body.

The learning-based recognition unit 120 detects a region of the human body using the information on the human body which is stored in the storage unit 140.

The modeling-based recognition unit 130 traces the movement of the detected region of the human body.

The controller 100 detects a region of the human body through the learning-based recognition unit 120 using the information on the human body which is stored in storage unit 140.

Then, the controller 100 traces a movement of the detected region of the human body through the modeling-based recognition unit 130. If it is difficult to trace the movement of the human body, the controller 100 traces the movement of the detected region of the human body through the learning-based recognition unit 120 using the information on the human body which is stored in the storage unit 140.

The image sensor 110 receives an input of an optical signal, and outputs an image. Here, the image to be output may include a depth image and a color image.

The storage unit 140 stores a signal or data to be input and output corresponding to the operations of the image sensor 110, the learning-based recognition unit 120, and the modeling-based recognition unit 130 under a control of the controller 100. Further, the storage unit 140 stores a control program and applications for controlling the human body recognition unit or the controller 100. In particular, the storage unit 140 stores the human body information calculated by the above-mentioned operation, such as the center point in each region of the human body, the coordinate of the center point, the length of each region of the human body, and the like.

Figure 2:
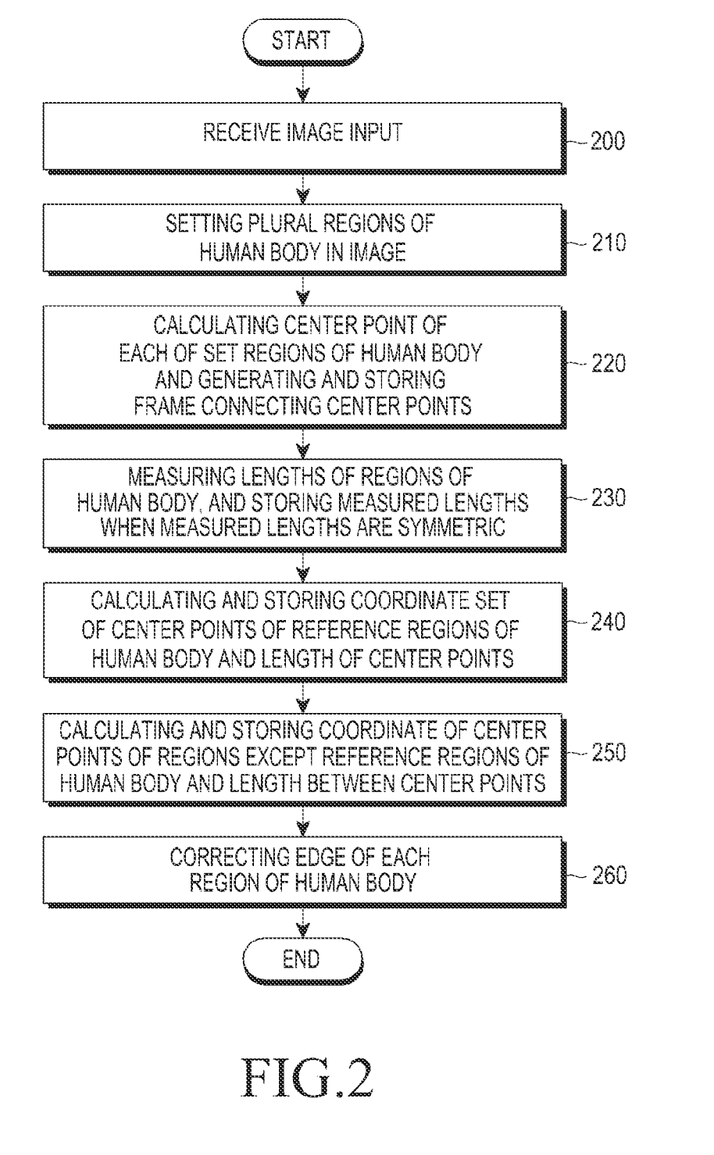
FIG. 2 is a flowchart illustrating a process of recognizing the human body in a hybrid manner according to an embodiment of the present invention.

FIG. 2 is a flowchart illustrating a process of recognizing the human body in a hybrid manner according to an embodiment of the present invention.

In step 200, the controller 100 receives an input of an image.

In step 210, the controller 100 sets a body image in the received image as a plurality of regions of the human body. Particularly, the controller 100 creates a labeled image by labeling the body image in the image into a plurality of regions.

In step 220, the controller 100 calculates a center point of each set region of the human body, and generates and stores a frame, in which the center points are connected with one another, in the storage unit 140.

Particularly, the controller 100 sets a characteristic for the image in each image labeled in step 210, and calculates a probability of each region of the human body corresponding to the image characteristic. The controller 100 sets each labeled region as a region of the human body corresponding to the highest probability based on the calculated probability, and calculates a center point of each set region of the human body. Then, the controller 100 generates and stores a frame, in which the center points in all regions of the human body are connected, in the storage unit 140.

In step 230, the controller 100 measures lengths of all regions of the human body, and stores the measured lengths in the storage unit 140 if the lengths are symmetric.

In other words, the controller 100 measures and stores a length between the center points of the regions of the human body. For example, the controller 100 measures lengths of the regions in pairs among the regions of the human body, and determines whether the measured lengths of the regions in the pairs of the regions of the human body are symmetric. If the measured lengths of the regions of the human body are symmetric, the controller 100 measures and stores a length of each region of the human body in the storage unit 140.

In step 240, the controller 100 calculates and stores a coordinate set of the center point in each reference region of the human body and a length between the center points in the storage unit 140.

Particularly, the controller 110 sets one or more regions of the human body as a reference region of the human body, and defines a set of coordinates for each of one or more reference regions of the human body based on a coordinate of a center point in each of the set reference regions of the human body.

Then, the controller 100 measures lengths of a left body region and a right body region, and determines whether the measured lengths of the left and right body regions are symmetric. If the lengths of the left and right body regions are symmetric, the controller 100 measures and stores a distance between the reference regions of the human body.

In step 250, the controller 100 calculates and stores a coordinate set of the center point in each region except the reference regions of the human body and a length between the center points in the storage unit 140.

For example, the controller 100 measures and stores a coordinate set of the center points of the at least one region of the human body included in the body region and the length of each region except the reference regions of the human body in the storage unit 140. Further, the controller 100 measures and stores a coordinate set of center points of hand and elbow regions and a length of each region of the human body in the storage unit 140.

In step 260, the controller 100 resets an edge in each region of the human body.

Particularly, the controller 100 detects an edge for the labeled image, and the edge for each region of the human body is reset by using the detected edge, the length of each region of the human body and the stored frame.

For example, the controller 100 detects the edge for the labeled image of the human body, and selects the shortest straight line from lines which extend vertically from each pixel constituting the detected edge to the frame. In turn, the controller 100 determines whether an intersection of the selected line with the frame is present in the measured length of the corresponding region of the human body. In other words, the controller 100 determines which position the intersection of the selected line with the frame is located at on the frame corresponding to a corresponding region of the human body, and whether the intersection is included in the frame corresponding to the measured length of the stored region of the human body. Here, the measured length of each region of the human body means a length of the frame corresponding to each region of the human body.

If the intersection of the selected line with the frame is positioned within the measured length of the corresponding region of the human body, the controller 100 maintains a setting for the edge corresponding to the corresponding region of the human body.

If the intersection of the selected line with the frame is positioned outside of the measured length of the corresponding region of the human body, the controller 100 identifies the region of the human body in which the intersection of the selected line with the frame is positioned, and resets the edge corresponding to the corresponding region of the human body by the edge corresponding to the identified region of the human body.

Figure 3:
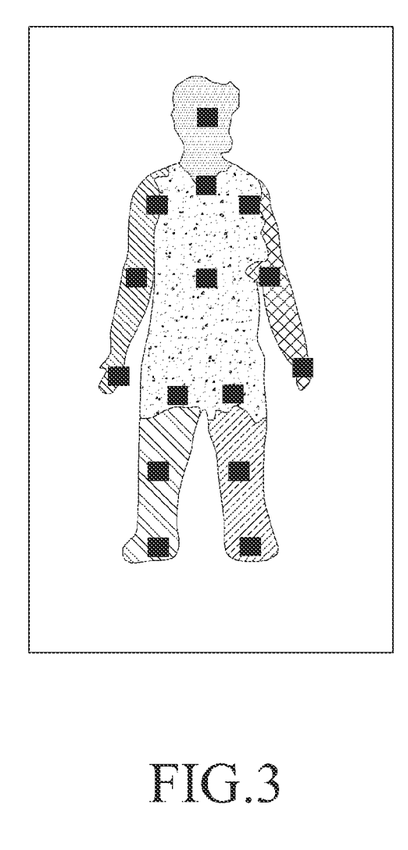
FIG. 3 is a view illustrating a process of calculating at least one region of the human body in an image according to an embodiment of the present invention.

FIG. 3 is a view illustrating a process of calculating at least one region of the human body in an image according to an embodiment of the present invention.

If the image is input, the controller 100 creates a labeled image which is obtained by labeling the image into a plurality of regions of the human body which have different colors. In the embodiment of the present invention, the input image is a depth image and will be described as an example. Here, the term "depth image" refers to an image in which depth information is expressed by shadow density, and a part of the human body located at a near position is expressed in darker shadowing, while a part of the human body located at a far position is expressed in lighter shadowing.

Then, the controller 100 sets characteristics corresponding to certain positions in the labeled region, compares the set characteristics with one another, and calculates a probability that each characteristic corresponds to each region of the human body, such as a hand region, a head region, a chest region and the like. Next, the controller 100 sets each labeled region as a region of the human body corresponding to the highest probability based on the calculated probability, and calculates a center point of each set region of the human body. The calculated center points can be expressed as shown in FIG. 3.

FIGS. 4A-4D are views illustrating an image used for resetting an edge in each region of the human body according to the embodiment of the present invention.

Figure 4A:
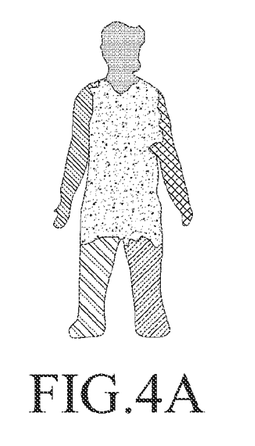
FIGS. 4A-4D are views illustrating an image used for resetting an edge in each region of the human body according to an embodiment of the present invention.
Figure 4B:
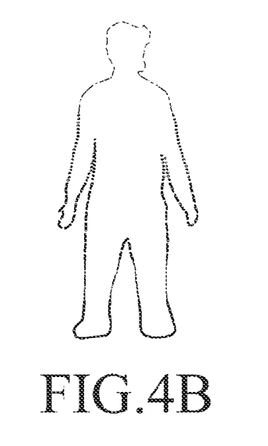
Figure 4C:
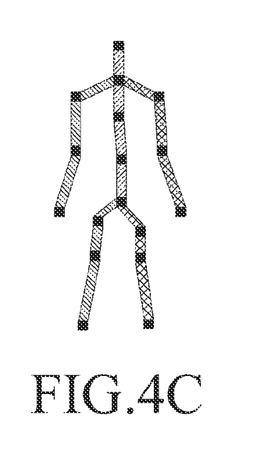
Figure 4D:
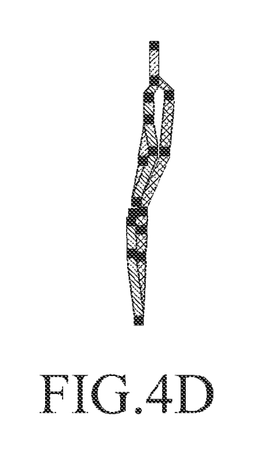

The controller 100 detects an edge indicated in FIG. 4B from the labeled image indicated in FIG. 4A. In turn, the controller 100 resets the edge in each region of the human body by using the detected edge, a length of each region of the human body and a frame indicated in FIG. 4C. At this time, in the present invention, since use of a three-dimensional image is an embodiment, the human body recognition can be performed considering a side of the frame indicated in FIG. 4D.

Figure 5:
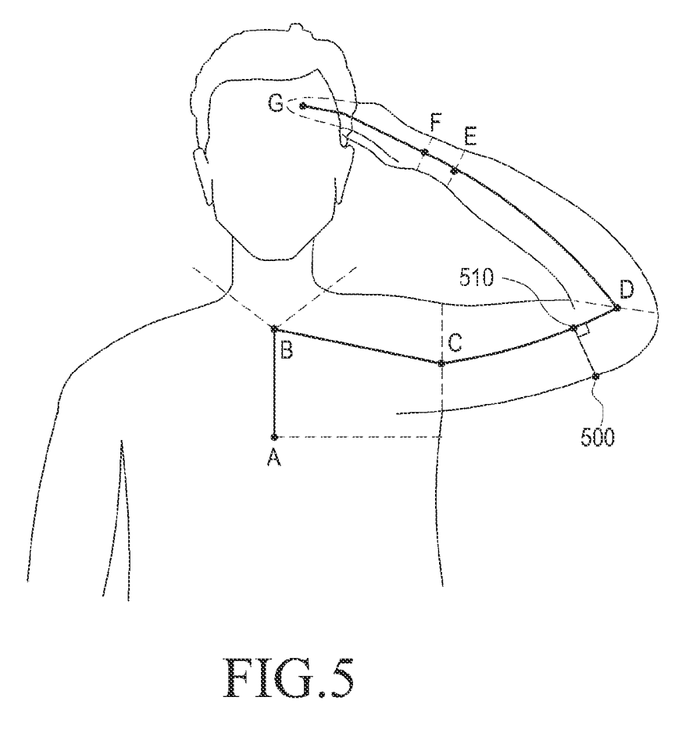
FIG. 5 is a view illustrating a process of resetting an edge in each region of the human body according to an embodiment of the present invention.

FIG. 5 is a view illustrating a process of resetting an edge in each region of the human body according to the embodiment of the present invention.

Referring to FIG. 5, the controller 100 detects an edge in the labeled image of the human body, and selects the shortest line among straight lines which extend from pixels forming the detected edge to the frame connecting the center points A, B, C, D, E, F and G, respectively. For example, assuming that a straight line extending from a certain pixel 500 on the edge to a frame connecting the center points C and D to be perpendicular to the frame is the shortest line, the controller 100 determines whether an intersection 510 of the selected line with the frame connecting the center points C and D is located in a length of the corresponding region of the human body.

If the intersection of the selected line with the frame is positioned within the measured length of the corresponding region of the human body, the controller 100 maintains a setting for the edge corresponding to the corresponding region of the human body.

If the intersection of the selected line with the frame is positioned out of the measured length of the corresponding region of the human body, the controller 100 identifies the region of the human body in which the intersection of the selected line with the frame is positioned, and resets the edge corresponding to the corresponding region of the human body by the edge corresponding to the identified region of the human body.

According to the present invention, as described above, the body information necessary for the recognition of the human body is calculated and stored in order to more clearly recognize the human body, and the accurate and precise recognition of the human body can be quickly performed by hybridizing the learning-based human body recognition technique and the modeling-based human body recognition technique using the stored human body information.

It may be appreciated that the embodiments of the present invention may be implemented in software, hardware, or a combination thereof. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, which are machine (computer) readable storage media, regardless of its ability to be erased or its ability to be re-recorded. The human body recognition method of the present invention can be implemented by a computer or a portable terminal including a controller and a memory, and it can be understood that the memory corresponds to an example of the machine readable storage medium which is suitable for storing a program or programs including instructions by which the embodiments of the present invention are implemented.

Accordingly, the present invention includes a program for a code implementing the apparatus and method described in the appended claims of the specification and a machine (a computer or the like)-readable storage medium for storing the program. Further, the program may be electronically transferred by any communication signal through a wired or wireless connection, and the present invention appropriately includes equivalents of the program.

Further, the human body recognition apparatus can receive the program from a program providing apparatus connected wirelessly or through a wired cable thereto, and store the received program. The program providing device may include a program having instructions which enable the human body recognition apparatus to perform a method of providing preset apparatus information, a memory for storing information necessary for a determination of the human body recognition apparatus, a communication unit for performing wired or wireless communication with the human body recognition apparatus, and a controller for transmitting a corresponding program to the human body recognition apparatus automatically or in response to a request of the human body recognition apparatus.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. An apparatus for recognizing a human body in a hybrid manner, the apparatus comprising:
   a memory;
   a camera configured to capture images; and
   a processor configured to:
   detect a body in a first image,
   detect a plurality of body parts corresponding to the body,
   calculate a center point of each of the plurality of body parts, wherein the center point is located in each of the plurality of body parts,
   generate a frame connecting the calculated center points,
   calculate distances between adjacent center points,
   store the calculated distances and the generated frame as at least part of body information,
   determine whether a first point of intersection of a frame corresponding to a first body part and a straight line vertically extending from a first pixel of an edge corresponding to the first body part is located in the frame corresponding to the first body part,
   if the first point is not located in the frame corresponding to the first body part, reset a region of the first body part,
   detect the body in a second image following the first image based on the stored body information, and
   detect a movement of the body between the first and second images.

2. The apparatus as claimed in claim 1, wherein the processor is further configured to:
   detect an outer edge of the body,
   reset the outer edge corresponding to each of the plurality of body parts based on the generated frame and the calculated distances, and
   store the reset outer edge as at least part of the body information.

3. The apparatus as claimed in claim 2, wherein each of the center points is located at a boundary between one body part and another body part.

4. The apparatus as claimed in claim 1, wherein the processor is further configured to set a part of the plurality of body parts as reference body parts, calculate coordinate sets of center points of the reference body parts and measure a length of each of the reference body parts based on the calculated coordinate sets.

5. The apparatus as claimed in claim 4, wherein the processor is further configured to calculate coordinate sets of center points of other body parts except for the reference body parts, and measure a length of each of the other body parts based on the calculated coordinate sets.

6. A method of recognizing a human body in a hybrid manner, the method comprising:
detecting a body in a first image;
detecting a plurality of body parts corresponding to the body;
calculating a center point of each of the plurality of body parts, wherein the center point is located in each of the plurality of body parts;
calculating distances between adjacent center points;
generating a frame connecting the calculated center points;
storing the calculated distances and the generated frame as at least part of body information;
determining whether a first point of intersection of a frame corresponding to a first body part and a straight line vertically extending from a first pixel of an edge corresponding to the first body part is located in the frame corresponding to the first body part;
if the first point is not located in the frame corresponding to the first body part region, resetting a region of the first body part;
detecting the body in a second image following the first image based on the stored body information; and
detecting a movement of the body between the first and second images.

7. The method as claimed in claim 6, further comprising:
generating a frame connecting the calculated center points; and
storing the generated frame as at least part of the body information.

8. The method as claimed in claim 7, further comprising:
detecting an outer edge of the body;
resetting the outer edge corresponding to each of the plurality of body parts based on the generated frame and the calculated distances; and
storing the reset outer edge as at least part of the body information.

9. The method as claimed in claim 8, wherein each of the center points is located at a boundary between one body part and another body part.

10. The method as claimed in claim 7, further comprising:
setting a part of the plurality of body parts as reference regions;
calculating coordinate sets of center points of the set reference regions; and
measuring a length of each of the reference regions based on the calculated coordinate sets.

11. The method as claimed in claim 10, further comprising:
calculating coordinate sets of center points of other body parts except for the reference regions, and
measuring a length of each of the other body parts based on the calculated coordinate sets.

* * * * *